United States Patent [19]

Kato

[11] Patent Number: 5,291,362
[45] Date of Patent: Mar. 1, 1994

[54] A RETRACTABLE BI-DIRECTIONAL TAPE HEAD MECHANISM

[75] Inventor: Sumiyoshi Kato, Hiki, Japan

[73] Assignee: Shinwa Kabushiki Kaisha, Tokyo, Japan

[21] Appl. No.: 907,040

[22] Filed: Jul. 1, 1992

[30] Foreign Application Priority Data

Jul. 3, 1991 [JP] Japan .................. 3-162588

[51] Int. Cl.⁵ .............................. G11B 5/55
[52] U.S. Cl. ..................... 360/106; 360/105
[58] Field of Search ............ 360/105, 109, 104–106

[56] References Cited

U.S. PATENT DOCUMENTS 3,800,324  3/1974  Nakamichi ............... 360/105 X
3,947,884  3/1976  Yokota et al. ............ 360/96.6
4,623,947  11/1986  Kasahara ................. 360/109
4,811,145  3/1989  Ogawa .................... 360/106

Primary Examiner—John H. Wolff
Attorney, Agent, or Firm—Thomas R. Morrison

[57] ABSTRACT

A switching plate includes a cam portion engaging a head moving plate for moving a head on an axis normal to a tape surface during a shifting operation so as to retract the head from the tape during shifts between forward and reverse to prevent surface damage to the tape. The switching plate carries a head driver having tapered ridges upon which a head holder rests. The head holder is movable on an axis parallel to the widthwise direction of tape. Shifting of the switching plate drives the head holder to rest upon elevated ridges for reverse mode operation or upon a second surface for forward mode operation.

16 Claims, 4 Drawing Sheets

A RETRACTABLE BI-DIRECTIONAL TAPE HEAD MECHANISM

BACKGROUND OF THE INVENTION

1. Field of the Invention

The present invention relates to a head mechanism of a tape player capable of bi-directional replay or bi-directional recording/replay of a magnetic tape, and more particularly, to a head mechanism which switches tracks between the forward and reverse directions by moving the head up and down the width of a magnetic tape.

2. Description of the Prior Art

Conventional cassette-type tape players switch between a forward and a reverse play/record direction using a mechanism which vertically shifts a head or heads while a cassette tape is in contact with the head. Japanese Utility Model Publication Laid-Open No. 58315/1988 provides an example of the conventional mechanism. In such a conventional tape player, the head mechanism moves up and down across the width of the magnetic tape in order to select one of two tracks on the magnetic tape, one track being for the forward play mode of operation, and the other track being for the reverse play mode of operation.

Conventional cassette-type tape players also employ a configuration wherein a guiding portion directs movement of the magnetic tape against a head. The guiding portion consists of a pair of tape guides positioned some distance away from the sides of the head.

The conventional head mechanism of a tape player described above, having the head constantly in contact with the tape, has an inherent problem in that the vertical movement of the head scrapes the surface of the magnetic tape and thus damages the magnetized layer of the tape. Another problem, due to tape contact with the head, is the shifting of a widthwise position of the tape when the head changes position thereby hindering change of tracks.

Furthermore, in conventional cassette tape players which have their guiding portions situated a distance away from the sides of the heads, positioning of the magnetic tape is unstable. When the head is shifted, the tape touching the head is moved transversely of the tape path by friction with the head. The tape soon straightens, which permits the tape to slacken.

The present invention overcomes the above problems associated with mechanisms that switch between forward and reverse tracks or recording and replaying positions. The object of the present invention is to provide a space between the magnetic tape and the head when the head switches positions relative to the tape thereby preventing damage to the magnetized layer of the tape, and preventing transverse displacement of the tape, when switching occurs and facilitating the reliable switching of tracks.

OBJECTS AND SUMMARY OF THE INVENTION

It is an object of the invention to provide a head shifting mechanism which overcomes the drawbacks of the prior art.

It is a further object of the invention to provide a head shifting mechanism which retracts the tape head from the tape during shifting between forward and reverse positions of the tape head.

Briefly state, the present invention provides a switching plate which includes a cam portion engaging a head moving plate for moving a head on an axis normal to a tape surface during a shifting operation so as to retract the head from the tape during shifts between forward and reverse to prevent surface damage to the tape. The switching plate carries a head driver having tapered ridges upon which a head holder rests. The head holder is movable on an axis parallel to the width direction of the tape. Shifting of the switching plate drives the head holder to rest upon elevated ridges for reverse mode operation or upon a second surface for forward mode operation.

The present invention overcomes the problems in the prior art cited above by retracting a head of a head mechanism when the head mechanism shifts between a forward and a reverse mode of operation. Furthermore, tape guides are provide to stabilize the tape during operation and shifting.

The head mechanism includes a switching plate having a cam portion engaging a head support structure having a head moving plate for moving a head on an axis normal to a tape surface during a shifting operation so as to retract the head from the tape and prevent surface damage. The switching plate carries a head driver having tapered ridges upon which the head holder carrying the head rests. The head holder is movable on an axis parallel to the widthwise direction of the tape. Shifting of the switching plate drives the head holder to rest on a first surface upon the ridges for reverse mode operation or upon a second surface for forward mode operation.

According to an embodiment of the invention, there is provided a head mechanism for positioning a head in bi-directionally operating tape machine comprising: means for shifting the head along a first axis in a widthwise direction of a tape between one of a forward mode position and a reverse mode position so as to respectively align the head with one of a forward track and a reverse track, means for retracting the head from the tape during shifting of the head between the forward and reverse modes, and the means for retracting including means for moving the head along a second axis generally normal to a surface of the tape.

According to a feature of the invention, there is provided a head mechanism of a tape player which switches between forward and reverse tracks on a tape when reversing direction of tape travel, head mechanism comprising: a head moving plate positioned to be movable perpendicularly to direction of movement of the tape, the head moving plate being provided with a cam follower pin projecting therefrom, a head holder to which the head is attached, head holder being so mounted on the head moving plate so as to be movable up and down width of magnetic tape, a head driver having forward mode support surfaces for supporting the head holder at forward mode position thereof, the head driver having reverse mode support surfaces for supporting head at reverse mode position thereof, and a switching plate for operating the head driver wherein a cam portion is formed for engaging the cam follower pin to move the head moving plate at time of switching operation in order to cause the head to retreat from a moving surface of the magnetic tape.

An embodiment of a head mechanism for positioning a head in bi-directionally operating tape machine comprises: means for shifting the head along a first axis in a widthwise direction of a tape between one of a forward mode position and a reverse mode position so as to respectively align the head with one of a forward track and a reverse track; and means for retracting the head from the tape during the shifting of the head from one of the forward and reverse modes to another one of the forward and reverse modes by moving the head along a second axis generally normal to a surface of the tape.

Another embodiment of the head mechanism may further comprise projections having notches for guiding the tape situated on both sides of said head for supporting said tape during shifting.

Furthermore, an embodiment of the present invention of a tape mechanism of a tape player which switches between forward and reverse tracks on a tape when reversing the direction of tape travel, the head mechanism comprises: a head moving plate positioned to be movable perpendicularly to the direction of movement of the tape; the head moving plate being provided with a cam follower pin projecting therefrom; a head holder to which the head is attached, the head holder being so mounted on the head moving plate so as to be movable up and down the width of the magnetic tape; a head driver having forward mode support surfaces for supporting the head holder at the forward mode position thereof; the head driver having reverse mode support surfaces for supporting the head at the reverse mode position thereof; and a switching plate for operating the head driver wherein a cam portion is formed for engaging the cam follower pin to move the head moving plate at the time of switching operation in order to cause the head to retreat from a moving surface of the magnetic tape.

An embodiment of the present invention operates as follows: a head mechanism, wherein tracks of a magnetic tape are switched between the forward and the reverse directions by means of moving the head in the widthwise direction of the magnetic tape. Operation of a switching plate actuates a head driver which supports a head holder on one of the forward mode support surfaces or the reverse mode support surfaces. The head driver moves the head in the widthwise direction of the magnetic tape thus positioning the head on either the forward or reverse track of the magnetic tape. The operation of the switching plate engages a cam follower pin of the head moving plate with a cam portion of the switching plate, thereby moving the head moving plate, and the head supported upon it, so that the head is retracted from the surface of the moving tape. The above configuration of a head mechanism creates a space between the head and the magnetic tape when the mode of operation is switched between the forward and the reverse directions and the head switches between forward and reverse tracks. The space between the head and the tape prevents damage to the magnetized surface of the tape. Thus, tracks of a magnetic tape are switched reliably while protecting the magnetic tape.

Another embodiment of the present invention includes an operation where a magnetic tape is restricted in movement in the widthwise direction at both sides of the head by guiding portions, so that stable replay and recording is ensured. Additionally, the tape is supported in its proper position when the head is moved and sagging of the tape due to a release of tension resulting from the head movement is prevented.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
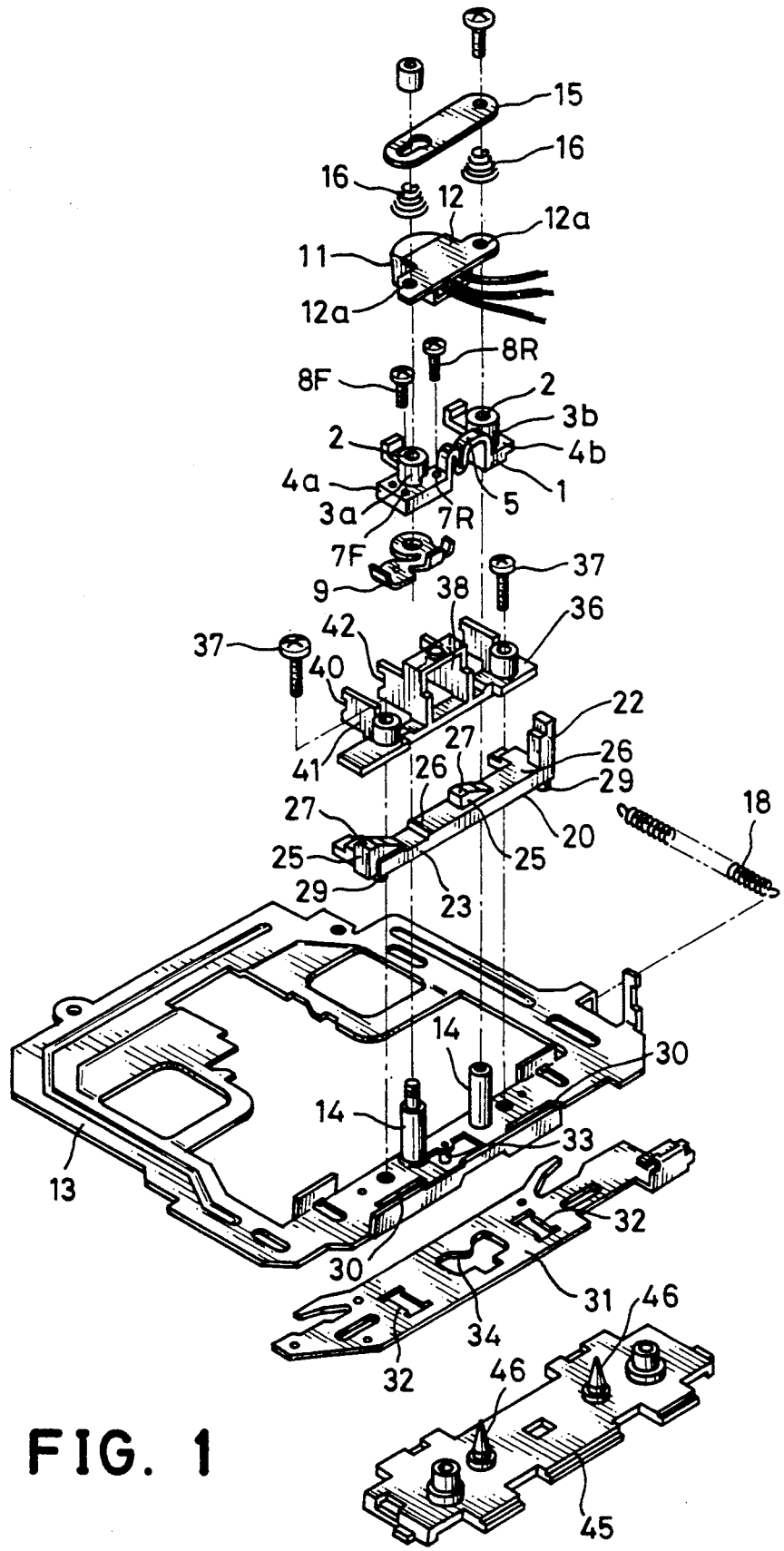
FIG. 1 is an oblique exploded view of an embodiment of a head mechanism of a tape player according to the present invention.

Referring to FIG. 1, a head holder 1 includes a pair of bearing portions, 3a and 3b, at the lateral sides thereof, each having a bearing hole 2 vertically bored through it. Support portions 4a and 4b are integrally formed at the bottoms of respective bearing portions 3a and 3b. Support portions 4a and 4b are connected together through a generally C-shaped connecting portion 5. A generally U-shaped wiring support portion 6 is formed in the top of C-shaped connecting portion 5.

A pair of laterally arranged vertical threaded holes 7F and 7R are bored through one of the support portion 4a. A forward adjusting screw 8F for adjusting the forward mode position and a reverse adjusting screw 8R for adjusting the reverse mode position are respectively screwed in threaded holes 7F and 7R.

Figure 2:
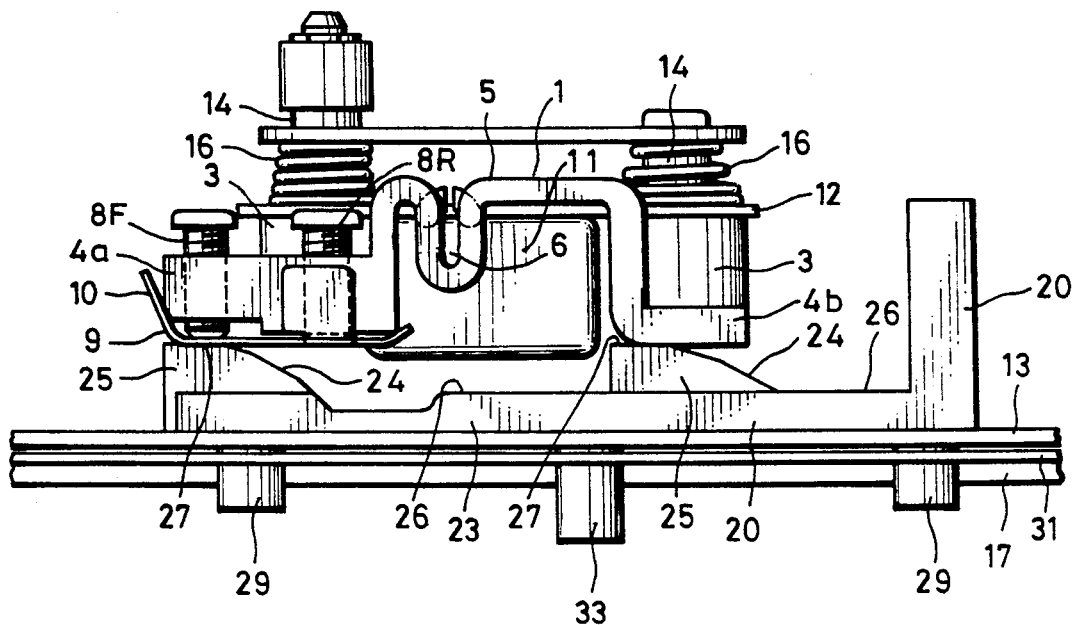
FIG. 2 is a front view of the head mechanism in the reverse mode.

Referring now also to FIG. 2, wear plate 9 is positioned at the bottom of support portion 4a. The tips of adjusting screws 8F and 8R abut wear plate 9. Wear plate 9 includes a rising portion 10 which rises from the edge of the wear plate so as to abut against a side of support portion 4a.

Referring again to FIG. 1, a head 11 is fixed to a bottom of a head setting plate 12. Head setting plate 12 is attached to the top of head holder 1 between bearing portions 3a and 3b. Head setting plate 12 includes through holes 12a at the positions respectively corresponding to bearing holes 2. Wires from head 11 are fitted through wiring support portion 6 and are thereby held in place.

Head holder 1, together with wear plate 9 and head setting plate 12, are supported by shafts 14, 14, which project upward from a head moving plate 13 and are respectively fitted through bearing holes 2, 2, in such a manner that holder 1 is vertically movable, allowing the head 11 to slide in a vertical direction parallel to the width of a magnetic tape. The head holder 1 is pushed downward in the vertical direction by springs 16, 16 which are interposed between head moving plate 1 and a spring setting plate 15 attached to tops of shafts 14, 14.

Head moving plate 13 is positioned so as to be movable, with respect to a chassis 17 (shown in FIG. 2), in a horizontal direction normal to the magnetic layer of the tape. Head moving plate 13 and head 11 are constantly biased toward the magnetic tape by means of spring 18. Therefore, head 11 moves away from the magnetic tape when force is applied to the head moving plate 13 in a rearward direction, and head 11 moves toward the magnetic tape when the force applied is removed and the bias force of the spring 18 controls.

A head driver 20 is disposed on head moving plate 13 so as to be movable in a lateral direction parallel to a direction of the movement of the magnetic tape during the playing operation. Head driver 20 consists of a generally L-shaped base 23 having at one end a vertical rising portion 22, and a pair of tapered ridges 25, 25 laterally arranged on a top of base 23. Sides of each tapered ridge 25 that face vertical rising portion 22 form inclined surfaces 24. Studs 29, 29 extend from a bottom of base 23, pass through apertures in chassis 17, and fit in guide holes 32 in a switching plate 31.

Figure 3:
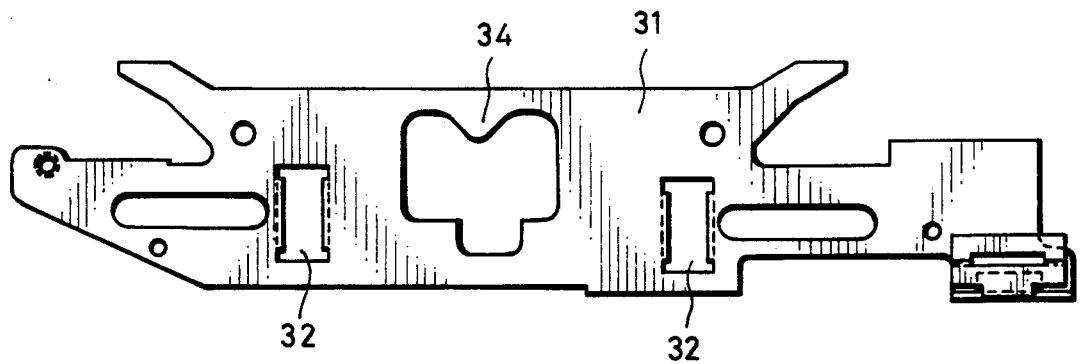
FIG. 3 is a top view of a switching plate of the head mechanism.

Referring now to FIG. 3, switching plate 31 guide holes 32 are long in a direction parallel to the width of the switching plate 31 and normal to a surface of the magnetic tape.

Returning now to FIG. 2, switching plate 31 is disposed between head moving plate 13 and chassis 17. Head driver 20 rests atop head moving plate 13 an moves laterally upon it as it is driven by lateral movement of switching plate 31 by studs 29, 29.

Figure 4:
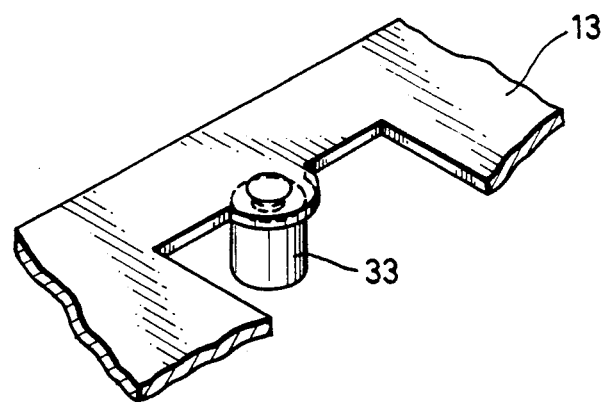
FIG. 4 is an oblique view of a cam follower pin of a head moving plate of the head mechanism.
Figure 5:
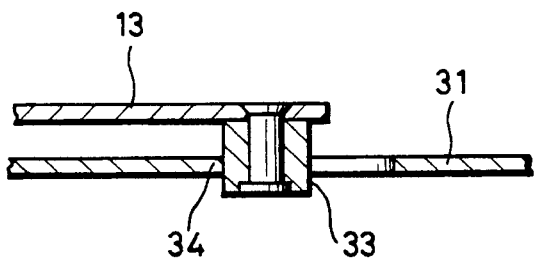
FIG. 5 is a sectional view showing the cam follower pin of the head moving plate engaging a cam portion of the switching plate.

Referring now to FIGS. 3, 4 and 5, a cam follower pin 33 projects downward from the center of head moving plate 13. An arc-shaped cam portion 34 is formed in switching plate 31. Cam portion 34 engages cam follower pin 33 when switching plate 31 is shifted laterally to switch tracks. Cam portion 34 applies force to cam follower pin 33, thereby driving head moving plate 13 in the rearward direction so that head 11 retreats from the moving surface of the magnetic tape.

Figure 6:
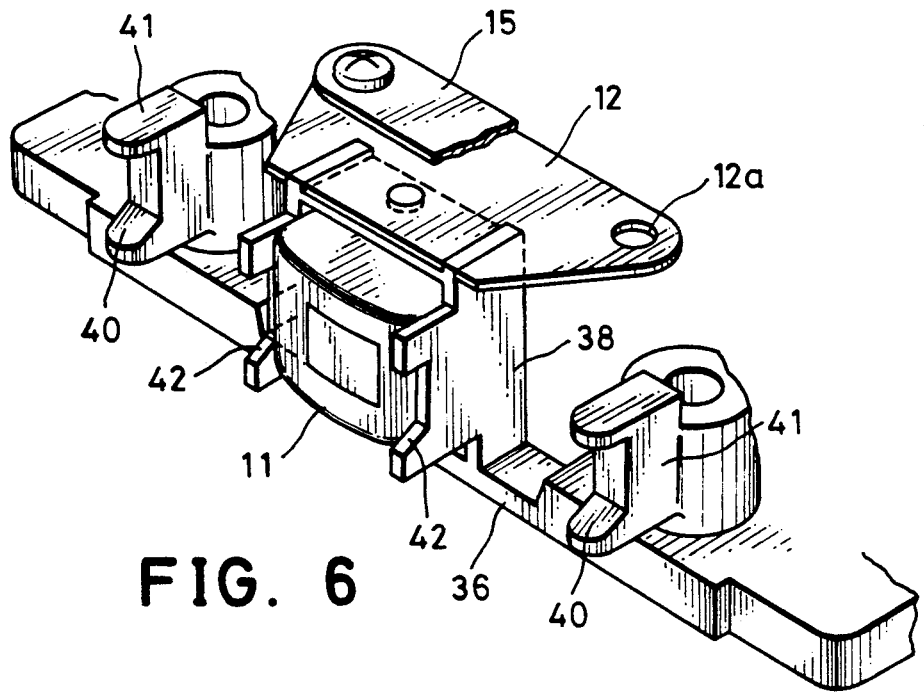
FIG. 6 is an oblique view of the principal part of a magnetic tape guide of the head mechanism.
Figure 7:
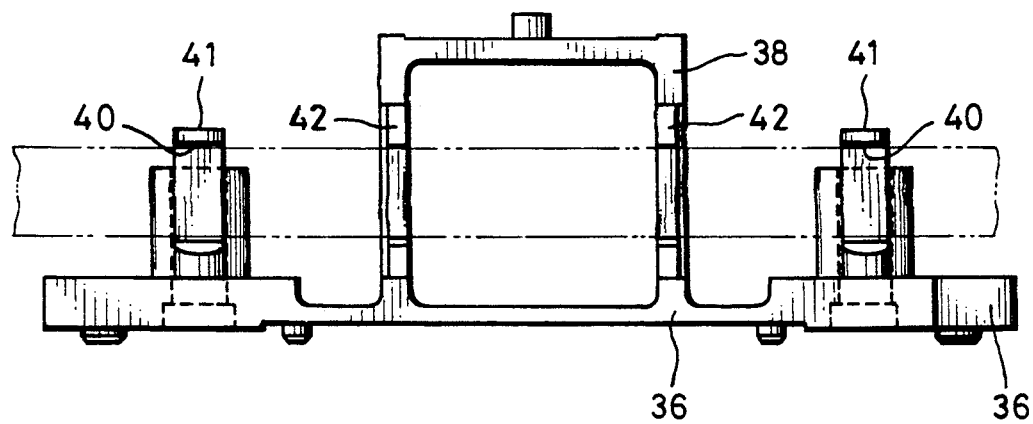
FIG. 7 is a front view of the magnetic tape guide.

Referring now to FIGS. 1, 6, and 7, a magnetic tape guide 36 is fixed to head moving plate 13 by screws 37. Magnetic tape guide 36 has a guiding frame 38 at its center for containing head 11 in such a manner that head 11 is movable in a vertical direction. Magnetic tape guide 36 has a pair of projections 41 located at the sides of and apart from magnetic tape guide 36. Projections 41 each have a first guiding notch 40. A pair of second guiding notches is cut in sides of guiding frame 38.

Finally, in FIG. 1, a magnetic tape cassette positioner 45 is shown. Cassette positioner 45 has guide pins 46, 46, that engage holes in a cassette (not shown) thereby positioning it for proper alignment with head 11.

The functioning of the present embodiment is explained herein regarding the switching of directional modes. The switching plate 13 is moved from the right to the left as viewed in FIG. 2. The switching plate 31 may be moved manually or by an interlocking means when an end of a tape is detected. The head driver 20 is moved from the right to the left by the switching plate 13 because it is engaged with the switching plate via studs 29, 29, and guide holes 32. After the switching plate is moved, head holder 1 is at its forward-mode position, with its support portions 4a, 4b in contact with forward mode support surfaces 26, 26 of head driver 20, and head 11 is positioned facing a forward track of a magnetic tape.

The azimuth between head 11 and the forward track of a magnetic tape may be adjusted when head 11 is at its forward mode position by rotating adjusting screw 8F. The projection of the tip of the screw from the lower surface of support portion 4a vertically moves the end of head holder 1 in a direction corresponding to the width of the magnetic tape, thereby inclining head 11. Since the tip of adjusting screw 8R is over clearance recess 28, adjusting screw 8R has no effect on the forward mode position of head holder 1.

Referring again to FIG. 2, in the reverse mode, head driver 20 is moved to the right so that support portions 4a, 4b of head holder 1 rest upon respective tapered ridges 25, 25. Head holder 1 is then at its reverse-mode position, with its support portions 4a, 4b in contact with reverse mode support surfaces 27, 27 of head driver 20. Head 11 is then aligned with the reverse track of the magnetic tape.

The azimuth between head 11 and the reverse track of a magnetic tape may be adjusted when head 11 is at its reverse mode position by rotating adjusting screw 8R. The projection of the tip of the screw from the lower surface of support portion 4a pushes the wear plate 9 and vertically moves the end of head holder 1 in a direction corresponding to the width of the magnetic tape, thereby inclining head 11. Since the tip of adjusting screw 8F is over clearance recess 28, adjusting screw 8F has no effect on the reverse mode position of head holder 1. Consequently, the azimuth between head 11 and the tracks of the magnetic tape in both forward and reverse modes of operation may be adjusted independently.

As described above, operation of switching plate 31 actuates head driver 20 so that head holder 1 is supported on either forward mode support surfaces 26, 26 or reverse mode support surfaces 27, 27. Head 11 is thus moved up or down the width of the magnetic tape and shifted to either a forward or reverse tracking position of the tape.

Figure 8:
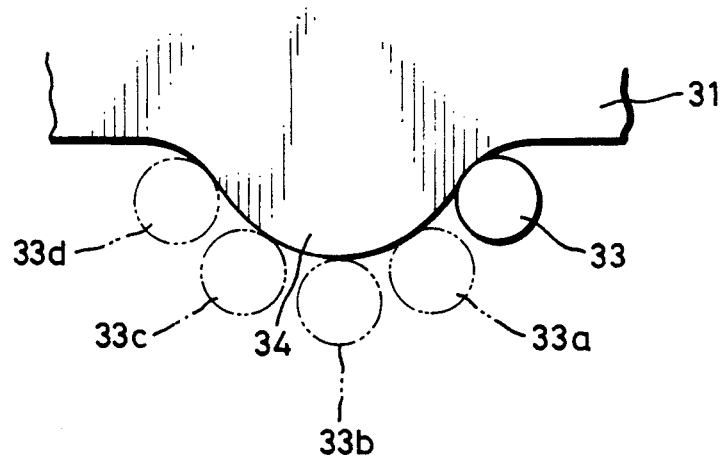
FIG. 8 is an sequential drawing showing engagement of the cam follower pin of the head moving plate with the cam portion of the switching plate.

Referring now to FIG. 8, a sequential depiction of the operation of the cam follower pin 33 of the head moving plate 13 engaging the cam portion 34 of the switching plate 31 is shown. When switching from forward to reverse modes, the left to right lateral movement of switching plate 31 causes cam follower pin 33 of head moving plate 13 to engage cam portion 34 of switching plate 31, thereby driving head moving plate 13 rearward. Cam follower pin 33 travels from position 33a to position 33b along cam portion 34 while remaining in contact with the cam portion 34 due to bias applied by spring 18 (shown in FIG. 1). Thus head 11, which is attached to head holder 1, which in turn is supported by head moving plate 13, is moved away from the moving surface of the tape. Upon completion of switching operation, cam follower pin 33 moves along cam 34 from position 33c to position 33d, head moving plate 13 is returned to the initial position by spring 18, and head 11 comes into contact with the magnetic tape.

When switching from reverse to forward modes, head 11 is retracted from the magnetic tape in an identical manner. The sequential travel of cam follower pin 33 and the movement of switching plate 31 is the reversed of that described above. The switching plate 31 is moved from right to left as shown in FIG. 2 and the tapered ridges 25 of the head driver 20 are move out from under the support portions 4a, 4b, of the head holder 1. The support portions 4a, 4b, come to rest upon the forward mode support surfaces 26, 26. The shifting of the switching plate 31 also moves the cam follower pin 33 which, in turn, retracts the head 11 from the magnetic tape.

The vertical position of the magnetic tape is maintained by first and second guiding portions 40, 42 when head 11 is moved due to switching between the forward mode and the reverse mode. The guide portions 40, 42 prevent the tape from sagging due to a release of tension on the tape when head 11 is removed from contact therewith. Restriction of the movement of a tape in its widthwise direction by guide portions 40, 42 at both sides of head 11 produces stable and reliable replay and recording.

An embodiment of the present invention is a head mechanism, wherein tracks of a magnetic tape are switched between the forward and the reverse directions by moving the head 11 in the widthwise direction of the magnetic tape. Operation of switching plate 31 actuates head driver 20 which supports head holder 1 on one of the forward mode support surfaces 26 or the reverse mode support surfaces 27. Head driver 20 moves the head in the widthwise direction of the magnetic tape thus positioning head 11 on either the forward or reverse track of the magnetic tape. The operation of switching plate 31 engages cam follower pin 33 of head moving plate 13 with cam portion 24 of switching plate 31, thereby moving head moving plate 13, and head 11 supported upon it, so that head 11 is retracted from the surface of the moving tape.

The above configuration of a head mechanism creates a space between head 11 and the magnetic tape when the mode of operation is switched between the forward and the reverse directions and head 11 switches between forward and reverse tracks. The space between head 11 and the tape prevents damage to the magnetized surface of the tape. Thus, tracks of a magnetic tape are switched reliably while protecting the magnetic tape.

It is understood that the function of cam portion 34 and cam follower pin 33 may be accomplish by an alternate structure including a linkage or a guide slot means. It is also recognized that the location of cam portion 34 and follower pin 33 may be interchanged That is, follower pin 33 may be attached to switching plate 31 and cam portion 34 may be part of head moving plate 13.

Another embodiment of present invention includes an operation where a magnetic tape is restricted in movement in widthwise direction at both sides of head by guiding portions 40, 42 so that stable replay and recording is ensured. Additionally, the tape is supported in its proper position when head 11 is moved and sagging of tape due to a release of tension resulting from head movement is prevented.

Having described preferred embodiments of invention with reference to accompanying drawings, it is to be understood that invention is not limited to those precise embodiments, and that various changes and modifications may be effected therein by one skilled in art without departing from scope or spirit of invention as defined in appended claims.

What is claimed is:

1. A tape head mechanism for positioning a head in alignment with a forward and a reverse track of a tape in a bi-directionally operating tape machine comprising:
   means for shifting said head along a first axis in a widthwise direction of a tape between one of a forward mode position and a reverse mode position so as to respectively align said head with one of said forward track and said reverse track; and
   means for retracting said head from said tape during shifting of said head from one of said forward and reverse modes to another one of said forward and reverse modes by moving said head along a second axis generally normal to a surface of said tape.

2. A head mechanism according to claim 1 wherein said means for retracting comprises:
   a head support structure for supporting said head such that a position of said head is fixed along said second axis with respect to said head support structure;
   a switching member engaged with said head support structure; and
   means for moving said head support structure along said second axis when shifting occurs and thus retracting said head from said tape during shifting.

3. A head mechanism according to claim 2 wherein said means for moving includes:
   a cam;
   means responsive to a shape of said cam, for moving said head support structure in a direction to move said head away from said tape during motion of said head between a forward and a reverse direction.

4. A head mechanism according to claim 2 comprising:
   a cam portion in one of said head support structure and said switching member;
   a cam following in the other of said head support structure and said switching member;
   means for biasing said cam follower along said second axis into contact with said cam by said bias means; and
   one of said cam and said cam follower being connected for concerted motion with said head support structure, whereby said head and said head support structure are displaced in a direction away from said tape during shifting actuated by said switching member movement.

5. A head mechanism according to claim 4 comprising:
   first and second projections on first and second sides of said head, respectively; and
   a notch in each of said first and second projections for supporting said tape during shifting.

6. A head mechanism according to claim 2 wherein said means for shifting comprises:
   means for supporting said head in said head support structure;
   said means for supporting including means for permitting said head to move along said first axis;
   a head driver member;
   first and second laterally disposed inclined tapered ridges on said head driver member; and
   said head driver member engaging said switching member and said head holder means such that a movement of said switching member between a first and a second position drives said head holder means between said forward mode position and said reverse mode position respectively by means of said tapered ridges.

7. A head mechanism according to claim 6 wherein said means for shifting comprises:
   forward position adjusting means for adjusting a position of said head relative to said tape when said head is in its forward position; and
   reverse position adjusting means for adjusting a position of said head relative to tape when said head is in its reverse position.

8. A head mechanism according to claim 7 wherein:

said head driver engages said switching member so as to move laterally in conjunction with said switching member;

said head driver has a pair of reverse mode support portions each atop one of said pair of tapered ridges; and a pair of forward mode support portions each laterally adjacent to a respective one of said tapered ridges;

a first and a second support portion resting upon one and another one of said reverse mode support surfaces while in said reverse position, and, upon one and another one of said forward mode support surfaces while in said forward position; and said tapered ridges on said head driver member drive said head holder upward along said first axis when said switching member is moved laterally.

9. A head mechanism according to claim 8 wherein:

said forward position adjusting means includes a forward adjustment screw passing through said first support portion to press against said one of said forward mode support surfaces and thereby incline said head for aligning it with said forward track of tape;

said reverse position adjusting means comprises a reverse adjustment screw passing through said first support portion so as to press against said one of said reverse mode support surfaces and thereby incline said head for aligning it with said reverse track of tape; and said head driver member has a recess under said reverse adjustment screw when said head holder means is in forward mode position so that reverse mode adjustment screw does not contact head driver member and is thus disabled.

10. A head mechanism according to claim 1 wherein said means for shifting includes:

a head support structure for supporting said head such that a position of said head is fixed along said second axis with respect to head support structure;

a switching member;

a head holder means for supporting said head in said head support structure such that said head is movable in direction of said first axis;

a head driver member having a pair of laterally disposed inclined tapered ridges;

said head driver member being engaged with said switching member and said head holder means such that a movement of said switching member between a first and a second position drives said head holder means between said forward mode position and said reverse mode position respectively by means of said tapered ridges.

11. A head mechanism according to claim 10 wherein said means for shifting comprises:

forward position adjusting means for adjusting position of said head relative to tape when said head is in forward position; and reverse position adjusting means for adjusting position of said head relative to tape when said head is in reverse position.

12. A head mechanism according to claim 11 wherein:

said head driver engages with said switching member so as to move laterally in conjunction with switching member;

said head driver has a pair of reverse mode support portions each atop one of said pair of tapered ridges, and a pair of forward mode support portions each being laterally adjacent to one of said tapered ridges;

said head holder means comprises:

a first and a second support portion resting upon one and another one of said reverse mode support surfaces while in said reverse position, and, upon one and another one of said forward mode support surfaces while in said forward position; and said tapered ridges on said head driver member driving said head holder upward along said first axis when said switching member is moved laterally.

13. A head mechanism according to claim 12 wherein:

said forward position adjusting means comprises a forward adjustment screw passing through said first support portion so as to press against said one of said forward mode support surfaces and thereby incline said head for purpose of aligning it with said forward track of tape;

said reverse position adjusting means comprises a reverse adjustment screw passing through said first support portion so as to press against said one of said reverse mode support surfaces and thereby incline said head for purpose of aligning it with said reverse track of tape; and said head driver member has a recess under said reverse adjustment screw when said head holder means is in forward mode position so that reverse mode adjustment screw does not contact head driver member and is thus disabled.

14. A head mechanism according to claim 13 comprising:

projections having notches for guiding tape situated on both lateral sides of said head for supporting said tape during shifting.

15. A head mechanism of a tape player for switchably aligning a tape head with forward and reverse tracks on a tape during reversal of a direction of tape travel, the head mechanism comprising:

a head moving plate positioned to be movable perpendicularly to the direction of movement of said tape;

said head moving plate being provided with a cam follower pin projecting therefrom;

a head holder having said tape head attached thereto;

said head holder being mounted on said head moving plate such that said tape head is movable up and down across a width of said tape to and from alignment with said forward tracks and alignment with said reverse tracks;

a head driver having forward mode support surfaces for supporting said head holder at a position wherein said tape head is aligned with said forward tracks;

said head driver having reverse mode support surfaces for supporting said head holder at a position wherein said tape head is aligned with said reverse tracks; and a switching plate for operating said head driver having a cam portion engaging said cam follower pin such that said head moving plate retracts said tape head from said tape during re-alignment of said tape head with one of said forward and reverse tracks.

16. A head mechanism of a tape player of claim 15 wherein:

the head moving plate is provided with first guiding portions for restricting a widthwise position of said tape and second guiding portions for restricting the widthwise position of said tape;

said first guiding portions being positioned next to opposite sides of said tape head, and between said second guiding portions and said opposite sides of said tape head.

* * * * *